(12) United States Patent
Philipp

(10) Patent No.: US 8,342,311 B2
(45) Date of Patent: Jan. 1, 2013

(54) INTERMEDIATE STORAGE DEVICE AND METHOD FOR OPERATING SUCH AN INTERMEDIATE STORAGE DEVICE

(75) Inventor: Kurt Philipp, Grenzach-Wyhlen (DE)

(73) Assignee: Rotzinger AG, Kaiseraugst (CH)

( * ) Notice: Subject to any disclaimer, the term of this patent is extended or adjusted under 35 U.S.C. 154(b) by 133 days.

(21) Appl. No.: 13/056,430

(22) PCT Filed: Jul. 29, 2009

(86) PCT No.: PCT/EP2009/059828
§ 371 (c)(1),
(2), (4) Date: Jan. 28, 2011

(87) PCT Pub. No.: WO2010/012788
PCT Pub. Date: Feb. 4, 2010

(65) Prior Publication Data
US 2011/0139579 A1 Jun. 16, 2011

(30) Foreign Application Priority Data
Jul. 29, 2008 (CH) ........................ 1191/08

(51) Int. Cl.
*B65G 1/00* (2006.01)
(52) U.S. Cl. ..................... 198/345.1; 198/435
(58) Field of Classification Search ............... 198/347.1, 198/347.3, 435
See application file for complete search history.

(56) References Cited

U.S. PATENT DOCUMENTS

| 1,901,928 | A | | 3/1933 | Olson | |
|---|---|---|---|---|---|
| 3,273,688 | A | * | 9/1966 | Foltz, Jr. | 198/435 |
| 3,520,396 | A | | 7/1970 | Lingg | |
| 5,636,722 | A | * | 6/1997 | Koop | 198/347.1 |
| 5,909,796 | A | * | 6/1999 | Soldavini | 198/435 |
| 7,156,607 | B2 | * | 1/2007 | Anderson et al. | 198/435 |
| 7,178,658 | B2 | * | 2/2007 | Philipp | 198/347.1 |
| 7,946,797 | B2 | * | 5/2011 | Smith | 198/435 |
| 8,011,492 | B2 | * | 9/2011 | Davi et al. | 198/347.1 |
| 8,109,380 | B2 | * | 2/2012 | Philipp | 198/347.1 |

FOREIGN PATENT DOCUMENTS

| EP | 0 534 902 | 3/1993 |
|---|---|---|
| WO | 2004 067412 | 8/2004 |
| WO | 2005 021410 | 3/2005 |

OTHER PUBLICATIONS

International Search Report Issued Dec. 14, 2009 in PCT/EP09/059828 filed Jul. 29, 2009.
U.S. Appl. No. 13/140,661, filed Jun. 17, 2011, Philipp.

* cited by examiner

*Primary Examiner* — James R Bidwell
(74) *Attorney, Agent, or Firm* — Oblon, Spivak, McClelland, Maier & Neustadt, L.L.P.

(57) ABSTRACT

A store-feeding device including a feeding conveyer with a belt catch that can be positioned in an infinitely variable fashion in a horizontal and/or vertical direction. The belt catch can be controlled by a controller such that products can be conveyed from a production station directly to the packaging station by a conveyer. If the packaging station is fully utilized or stopped, the belt catch can be positioned such that the products can be placed in the store. A further conveyer can be loaded with rejected or faulty series of products. For this purpose, the belt catch can be retracted and lowered.

13 Claims, 6 Drawing Sheets

INTERMEDIATE STORAGE DEVICE AND METHOD FOR OPERATING SUCH AN INTERMEDIATE STORAGE DEVICE

The invention relates to an intermediate storage device according to the generic term of patent claim 1, as well as to a method for operating such an intermediate storage device. Such an intermediate storage device is known from document EP 0 534 902 A1.

DESCRIPTION

The products can, for example, be chocolate bars that are transported from a production device to at least one packaging device. Instead of chocolate bars, the objects can, however, consist of other pieces of sweet or non-sweet edibles, for example, pastry, or cans or other containers with any kind of filling, or of components for machine building, for example, ball bearings that are transported to a packaging device or other processing device.

In known devices for the production and packaging of chocolate bars, the bars produced by a production device are customarily transported by means of a feeding panel consisting of conveyor belts to chain boxes, subsequently through these to the packaging devices. Each chain box can, for example, be designed approximately according to DE 9012074 U, and serve as a balancing device to balance fluctuations in the feed rate of bars or the packaging rate of the packaging device, as well as of complete, momentary interruptions in operation of the production device or the packaging device. Such a chain box has several gondolas or shelf boards attached to two continuous chains for depositing and/or receiving a series of bars respectively. Each chain is redirected by several chain wheels mounted in a frame and by several chain wheels mounted at vertically adjustable carriages, and forms a number of loops.

In prior art, intermediate storage devices are also known that have several long belts arranged on top of each. Thereby, the belts positioned above each other are loaded and emptied with a reversible junction belt. The products are stored in rows behind each other along a long storage distance. A significant disadvantage of this device is the large space requirement, as the belts can reach expanses of several dozen meters.

Document WO 2005/021410 A1 reveals several conveyors working together, whereby at least two loading conveyors located above each other and at least two unloading conveyors located above each other are present, and whereby between the loading and unloading conveyors, auxiliary conveyors that are rotatable around horizontal axes are located, by means of which objects to be transported from a first or from a second loading conveyor to a corresponding unloading conveyor can be transported. Thereby, it is to be achieved that objects coming from a loading conveyor can be transferred in an effective way to one of the two unloading conveyors by means of the auxiliary conveyor. In one variant of an embodiment, the auxiliary conveyor is designed longitudinally adjustable.

Document WO 2004/067412 describes a conveyor with a conveyor belt that is filled with slats, which has a receiving area and a delivery area between which, for example, food can be transported in one direction of transport from the receiving area to the delivery area, whereby the conveyor is formed by several sections so that a transport section—given a fixed input section of the conveyor—can be adjusted parallel to the transport section of the output section of the same. In addition, the output section of the conveyor is adjustable in height, whereby for this, the transport belt can be automatically adjusted longitudinally.

Further, devices for loading products on gondolas or shelf boards are known in prior art. From U.S. Pat. No. 1,901,928, for example, a device is known for transferring bowls at a routine distance with respect to each other from a horizontal conveyor to a vertical conveyor, whereby between the horizontal conveyor and the vertical conveyor a rotatable conveyor belt is mounted around its upstream deflection pulley, and whereby the belt has carriers at regular distances. Due to a rigid mechanical coupling between the vertical motion of the downstream conveyor belt and the movement of the vertical conveyor, a constant distance between the shelf boards of the vertical conveyor is contingent, which is not satisfied in many pass-through and/or intermediate storage devices. In addition, a unit for feeding products according to EP 053492 is known in prior art, in which the device cited above is developed further thereby, that the movement of the rotatable conveyor belt is possible independent of the movement of the vertical conveyor, so that the product transfer is possible while the vertical conveyor is idle, as well as also when it is in motion. The known store-feeding devices have shown, however, to be disadvantageous considering that due to the rotation of the rotatable conveyor, its upstream belt catch or conveyor band end moves radially around the axis of rotation and is thereby at different distances from the shelf boards mounted above each other.

Document U.S. Pat. No. 3,520,396 relates to a loading station for loading piece goods onto transport means such as, perhaps ships. By means of a reversible belt conveyor, the goods are feed to a vertical conveyor. The reversible conveyor is designed rotatable and longitudinally adjustable and transfers the piece goods to a shelf board that is guided downward by means of the vertical conveyor. It is disadvantageous in this system that the reversible conveyor, although it is rotatable and longitudinally adjustable, the rotation is limited according to the one shelf board at the transport speed of the vertical conveyor in a small section. The known storage devices work according to the principle of "first in—first out", and have an input station for storing products and an output station for delivering products. The output station is located opposite to the input station at the storage device. It has been shown to be a disadvantage of these devices that the stored products must thus pass through the storage device. This has, among other things, the consequence that such a storage device requires a minimum filling of product series. In addition, upon the conclusion or end of production, the storage device must be emptied for a relatively long time, which has the consequence of unproductive holding times at other machines. Due to the functional limitations, a storage device operating according to the "first in—first out" principle can also only use some of the gondolas for storing products.

That is why the present invention is based on the objective to further develop a store-feeding device or a loading device of the type cited at the beginning in such a way, that the disadvantages of prior art are avoided as far as possible, in particular, that the storage throughput of products can be optimized.

A further objective consists therein, that in addition to the storage device, at least one additional deposit rack is to be loadable with products supplied by production.

A further objective of the invention consists therein, to design the packaging of products more efficiently, in particular to guarantee continuous packaging of products.

These problems are solved in accordance with the invention by means of an intermediate storage device with the characteristics of claim 1, as well as a method for operating such an intermediate storage device according to claim 11, 12 or 13. Advantageous further developments of the intermediate storage device in accordance with the invention are given by the subordinate claims.

In particular, the goals of the present invention are achieved by a store-feeding device with a feeding conveyor for transporting products in a main direction of transport between a in-bound end for receiving products and an outbound end for delivering and feeding the products to a an intermediate storage device, also described as storage device, whereby the storage unit has several product deposit racks for intermediate storage of products, whereby at least two continuous store loops of the storage device are present by means of which the product deposits can be transported between an input station for receiving the supplied products and an output station for delivering the intermediately stored products, whereby the product deposit racks in the section of the input station are at a vertical distance with respect to each other and the products can be transported by means of the rotatable feeding conveyor to several product deposit racks that are located above each other, whereby the feeding conveyor is designed longitudinally adjustable in the primary direction of transport, whereby the outbound end of the longitudinally adjustable and rotatable feeding conveyor can be positioned freely horizontally and/or vertically between several product deposit racks and at least one additional conveyor serving as temporary product deposit rack.

For the operation of the store-feeding device, the outbound end of the conveyor is positioned infinitely variable in horizontal and/or vertical direction by means of deflection means that can be driven by motor based on control and/or data signals of the controller, in order to selectively transport and/or deposit onto the horizontal delivery conveyor, onto a product deposit rack of the storage device, or onto the reject conveyor.

Likewise, for the operation of the store-feeding device, the outbound end of the conveyor can be positioned infinitely variable in horizontal and/or vertical direction by means of the deflection means that can be driven by motor based on control and/or data signals of the controller, in order to deposit products onto the conveyor.

In addition, for the operation of the store-feeding device, the outbound end of the conveyor can be positioned infinitely variable in horizontal and/or vertical direction by means of the deflection means that can be driven by motor based on control and/or data signals of the controller in order to deposit the products on at least one shelf board of a gondola in the storage unit.

One of the advantages of the device in accordance with the invention lies therein, that loading of the packaging machine is possible from the flow as well as also directly from the storage device. The capability of the free positioning of the belt catch and/or the outbound end of the feeding conveyor means, that the belt catch can not only be positioned horizontally and/or vertically along a specified circular arc around the axis of rotation, but can be aligned infinitely variable and in a certain section aligned as desired. This certain section can be designed in such a way that several product depositing racks located above each other can be loaded at the input station of the storage device, for example, up to six product deposit racks.

A further advantage lies therein, that in the standard case, the series of products can be transported by the shortest path into the packaging machine and do not have to, as is otherwise customary, first be guided through the storage device. The series of products are fed into the storage device only in the event of a stop and/or interruption of the packaging station.

Another advantage of the device in accordance with the invention further consists thereof, that an efficient possibility exists for re-feeding products from the storage device into the running product flow. Thus, the storage device can also be emptied into the running product flow.

A further advantage consists thereof, that the store-feeding device and an adjacent storage device can be maintained on a small surface area and still make a high degree of storage capacity possible. As a result, production costs and site costs can be saved in contrast to known devices and systems.

In a variant of an embodiment of the invention, the conveyor for delivering products is mounted horizontal to the main direction of transport of the feeding conveyor, in order to feed the products to a processing machine, for example, a packaging machine that is downstream of the conveyor. One of the advantages of the invention is that the products can be taken over by the supply conveyor as well as by the storage device on account of the horizontal conveyor, which represents a high degree of flexibility in the loading of the packaging system. When packaging products, a steady and uninterrupted flow or stream of products is to be supplied for packaging, which is possible with the store-feeding device in accordance with the invention.

In a different variant of an embodiment of the invention, the store-feeding device comprises an additional conveyor, which is located between the supply conveyor and the storage device, in order to take over the products from the supply conveyor or at the output station from the storage device, in order to supply the products to a processing machine, for example, a processing station that is downstream of the conveyor. One of the advantages of the invention is that defective product series can be separated from the production process and/or product flow by means of this additional conveyor. This possibility of separating defective products represents an important component of the store-feeding device.

In a further variant of an embodiment of the invention, the storage device comprises at least one gondola mounted articulated at the store loops, whereby each gondola is provided with several product depositing racks designed as shelf boards, that the store loops are guided continuously around deflection pulleys, whereby at least one deflection pulley of each store loop can be driven by motor, that the output station of the storage device comprises at least one slider for delivering products to at least one conveyor, whereby the slider is mounted in such a way that products can be slid almost horizontally from a shelf board that is to be emptied onto each conveyor. One of the advantages of the invention consists therein, that products transported from the production station, in particular in the case of an interruption of the packaging station, can be stored in the storage device. Thus, production of the products can be operated continuously. Thereby, the products transported in series are stored intermediately on shelf boards of gondolas. In the present variant of an embodiment, the gondolas circulate in the storage device by means of the store loops.

In one variant of an embodiment of the invention, the input station and the output station are located on the same side of the storage device. One of the advantages of the invention is that products can be slid out of the storage device by means of the feeder at an optimal point in time onto a conveyor leading to the packaging station and/or when production has just been interrupted. As a result, the packaging machine can be supplied continuously. An additional advantage consists therein, that the packaging speed can be increased thereby, that products can be fed to the packaging machine from the storage device, as well as coming from the distribution conveyor by means of a joint conveyor leading to the packaging machine.

In a different variant of an embodiment of the invention, the input station, as well as the output station of the storage device, is located on the side of the storage device that is facing the supply conveyor. One of the advantages of the invention consists therein that for one products can be transported directly out of the production flow by means of the supply conveyor onto a horizontal delivery belt, and for another, products that are intermediately stored in the storage device can be transported onto the same horizontal delivery belt by means of the slider of the storage device. Thus, the horizontal delivery band that is preferably located horizontal to the main direction of transport can be loaded with products from several sources, which increases the reliability of the feeding of the packaging machine. In addition, it is advantageous that the stored products can be slid out again after one cycle of upward motion of the storage device at the input station already. Thus, a stored product is not required to first be transported through the storage device, in order to subsequently be pushed out.

In a further variant of an embodiment of the invention, the store-feeding device comprises a controller for controlling and/or regulating the deflection means that can be driven by motor with based on sensor signals that can be generated by sensor means. One of the advantages of the invention is that the store-feeding device can be controlled and/or regulated depending on various sensor signals that are relevant for the production process. The belt catch can be positioned infinitely variable horizontally and/or vertically, depending on these signals. Thereby, the products can either be fed to the packaging station or to the storage device, whereby the conveyor equipped with the two-axle belt catch that can be positioned infinitely variable serves as distribution conveyor. The speed of the band or belt of this conveyor can likewise be varied. If need be, defective products can be separated out of production and be fed to an additional conveyor for disposal. As sensor means, light curtains are used, for example, or inductive proximity sensors, by means of which corresponding sensor signals can be generated and can be supplied to the controller.

In one variant of an embodiment of the invention, deflection means that can be driven by motor for rotating the supply conveyor around an axis of rotation are present and further, deflection means that can be driven by motor for extending or shortening the longitudinally adjustable supply conveyor are likewise available. One of the advantages of the invention consists therein, that the ability to freely position the outbound end of the feeding conveyor can be accomplished by means of, for example, electric drives, hydraulic drives or the like. Preferably, a controllable electric drive with a transmission is present, by means of which a lever arm can be driven for lifting the belt catch. And a drive with transmission is present, by means of which a sliding arm for extending or shortening the telescopic supply conveyor is available.

In one variant of an embodiment of the invention, the supply conveyor is designed as an integral continuous conveyor. One of the advantages of the invention consists therein, that the feeding conveyor does not have any transitions between several belt sections. The arrangement of the products transported in series thereby remains intact and is also not impaired by the rotation or the change in length of the feeding conveyor.

In one example of a variant of the invention, the input station of the storage unit is at a distance from the output station of the storage unit by at least two vertically adjacent product depositing racks. One of the advantages of the invention consists therein, that for repositioning the belt catches between the first free shelf board in the storage device that is to be filled with products and between the position for depositing products onto the horizontal delivery conveyor, the feeding conveyor travels the shortest possible path. After transporting the gondolas at the store loops of the storage device by a shelf board distance downward, a free shelf board to be loaded with product is already available by means of the feeding conveyor. The working together between the feeding conveyor, storage device and horizontal delivery conveyor is thereby efficiently designed and optimized.

The following terms have the following meaning:

Feeding conveyor: Transport means, in particular with a conveyor belt and/or belt conveyor. Other terms that are used include loading conveyor, supply conveyor or distribution conveyor. The conveyor customarily has a belt that can be driven running forward and backward by means of a motor.

Horizontal conveyor: Conveyor, which is preferably located almost at a right angle to the main direction of transport of the products. in order to customarily feed the products to a packaging machine. Additionally used terms are horizontal delivery belt, horizontal delivery conveyor, delivery conveyor or horizontally mounted conveyor.

Storage device: Additional terms used are storage unit, intermediate storage device, piece goods storage device or chain box and serve in particular, for at least temporary storage of piece goods arranged in series, whereby the storage device, when viewing the production flow, is located between a production machine and a packaging machine.

Gondola: Storage unit of an intermediate storage device with mostly several shelf boards located above each other on which products can be stored temporarily, whereby each gondola is detachably hung at several points of suspension at store loops or chains of the storage device.

Product depositing rack: Shelf board, tier, depositing level of a storage device, in order to temporarily accept products for intermediate storage.

In the following, the invention is explained in more detail in conjunction with the examples of embodiments illustrated in the drawings. Hereby, additional important characteristics and advantages are given by the drawings and their description.

Figure 1:
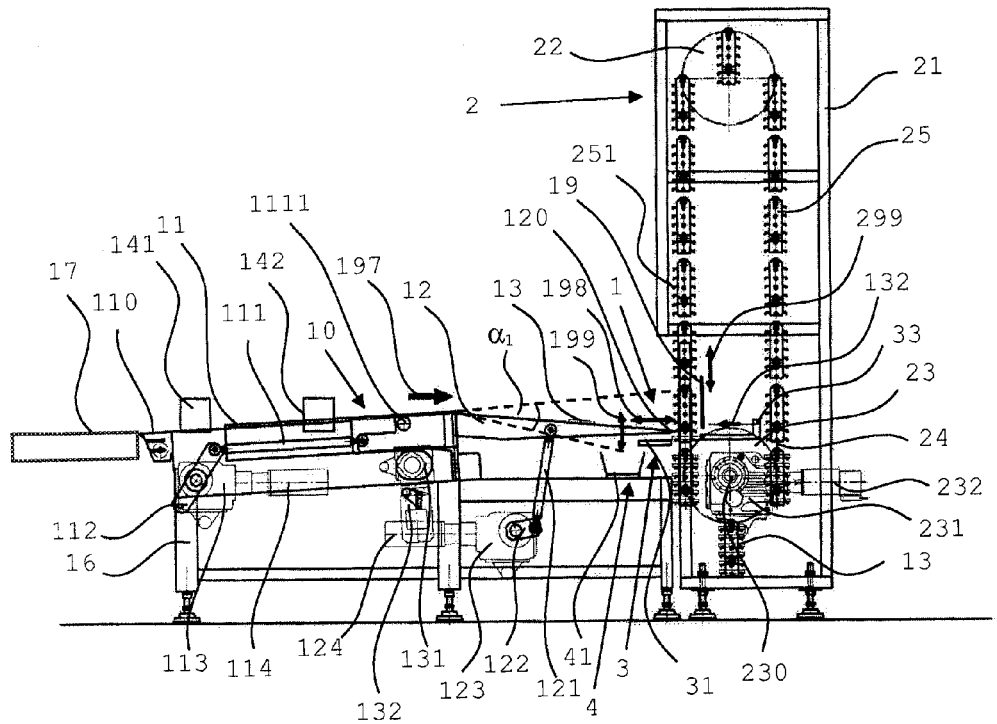
FIG. 1 shows a schematic lateral view of the loading device according to the invention with a subsequently located storage device.

FIG. 1 illustrates a store-feeding device according to the invention that is labeled with reference number 1. It has a conveyor belt or a loading conveyor 10, which comprise or which comprises a conveyor belt section 12. This conveyor belt section 12 has a conveyor belt end or outbound end or belt catch 120, which is driven vertically rotatable by means of drive and deflection means. This rotation is illustrated by the double arrow with reference number 199. The drive and deflection means comprise a motor 124, a transmission 123 and a lever arm system 121, 122. The lever arm system is preferably executed by means of a push rod 121, as well as a lever 122. The outbound end is located in the outbound section of conveyor 10. The loading conveyor 10 has an additional conveyor belt section 11, which is customarily rigidly connected with a chassis and/or a frame structure 16. This conveyor belt section has an inbound end 110 that is located in the input section of conveyor 10. The motor-driven drive of the conveyor belt customarily consists of a servomotor that can be controlled and/or regulated.

Figure 2:
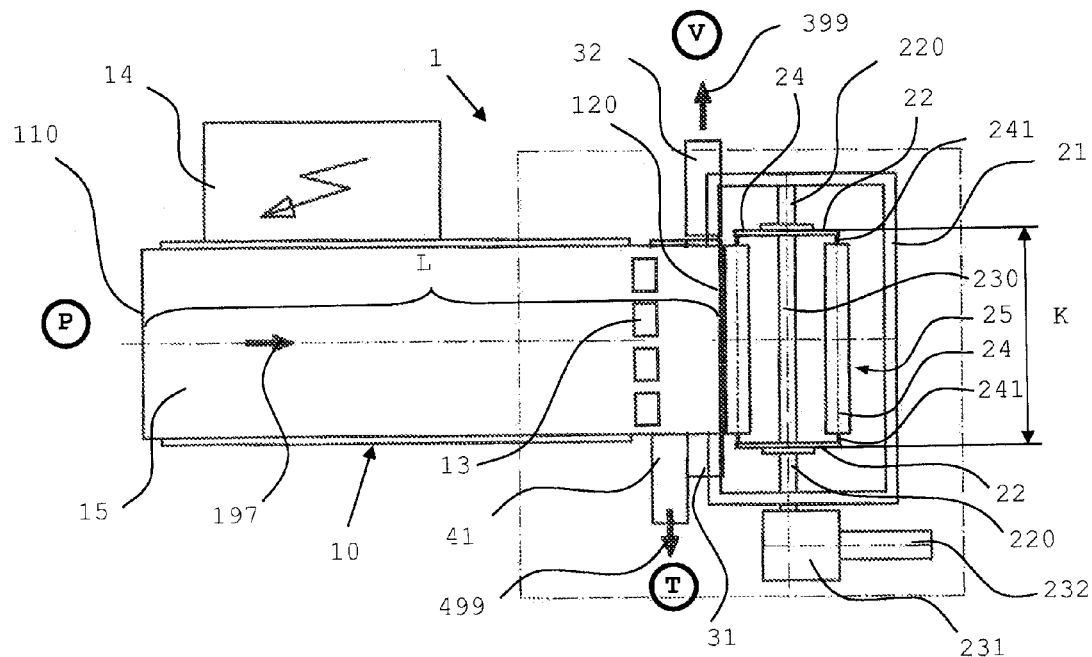
FIG. 2 shows a schematic top view of the store-feeding device.
Figure 3:
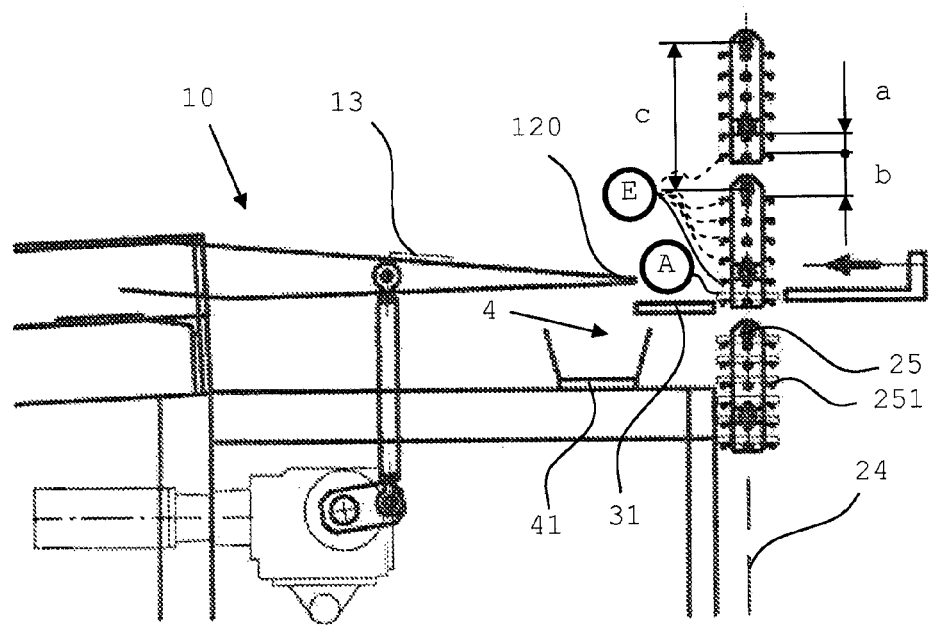
FIG. 3 shows a detail of the store-feeding device in the initial position in a schematic lateral view.

The transport speed of the loading conveyor 10 can thereby be controlled infinitely variable. The feeding conveyor or supply conveyor 10 is also designed in such a way by means of a drive 113, 114 and a lever arm system 111, 112, so that at an end facing a storage device 2 of the loading conveyor or the belt catch 120 is driven almost horizontally displaceable, as is illustrated by the arrow with reference number 198. Even this drive comprises a motor, for example, an electric motor 114 or a hydraulic drive with corresponding lever arm system 111, 112, whereby the section of conveyor belt 12 that is directed toward the storage device is pushed telescope-like into the conveyor section 11 that is further removed from conveyor belt section 11. This lever arm system preferably consists of a rod 111 and a lever 112. The conveyor belt section 11 can be mounted at a slight incline. From FIG. 1 it can be seen that the displaceable conveyor belt section 12 can be rotated around an axis or rotation 1111, which is mounted on a carriage that is guided in a rigid conveyor belt section 11 rotatable around an angle $\alpha_1$. In a further embodiment, however, the axis of rotation 1111 can also be located at end 110 of supply conveyor 10 that is removed from the storage device, so that the loading conveyor 10 that can be telescopically extended and/or shortened is mounted rotatable or pivotable in its entirety around this axis of rotation 1111. Thereby, that the loading conveyor 10, and in particular the belt catch 120 that is aligned toward storage device 2 is mounted articulated in horizontal as well a in vertical direction, a two-dimensional section analogous to an X and Y coordinate system can be worked. In this section, the belt catch 120 can be positioned in almost any way. As a result, it becomes possible to deposit the product series 13 that is located on the belt catch 20, by simultaneous lowering and retracting belt catch 120, onto conveyor belt 31, located preferably underneath and horizontal to the production line. This series of products 13 is then transported by the conveyor belt 32 that is shown in FIG. 2 into the packaging machine V, which is not shown. In the event of an interruption of the packaging machine V, the empty shelf boards 251 of gondolas 25 in storage device 2 can be loaded. The storage device 2 has a chassis or a frame structure 21. In this frame structure 21, respective pairs of deflection pulleys 22, 23 are located on at least one shaft 220 (see FIG. 2) and on at least two freely running stub shafts 230. The preferably at least one shaft 220 is customarily mounted in the lower section of storage device 2, and driven by means of a transmission 231 driven by an electric motor that can be controlled or regulated. Respectively around a first and least a second deflection pulley 22, 23—mounted in alignment, a store loop 24 is arranged. The store loop 24 is preferably designed as continuous belt or chain. A store loop can also be guided over several deflection pulleys, so that the storage device 2 can accept additional gondolas 25. At least two store loops 24 are at a distance K from each other according to FIG. 2. At the store loops 24, several gondolas 25 are preferably mounted detachable. Respectively one gondola 25 is guided past the input station E or the output station A of the storage device as can be seen in FIG. 3. At the output station A, at least one row of products 13 is delivered onto a deposit rack by means of at least one slider 33. The deposit rack of the output station A of storage device 2 is customarily designed as conveyor. At the input station E of storage device 2, at least one deposit rack is loaded with products 13. The drive of the store loops 24 customarily has an electric motor 232 with a transmission 231, which is preferably connected with a shaft 231 that lies below and drives the store loops 24 over the deflection pulleys 23. The driving can be in cycles, so that a distance a, as shown in FIG. 3, a distance b or any other kind of distance or path, such as perhaps a distance c can be covered. The store loop 24 can be driven in two directions, as is illustrated by the double arrow with reference number 299. The chains or store loops 24 are thereby kept revolving reversibly. From FIG. 1 it thus becomes clear that a packaging station V can be loaded by means of a conveyor belt 31, 32 on the one hand by means of the loading conveyor 10 with series of products 13, and on the other hand, products 13 can be pushed out from storage device 2 adjacent to the feeding conveyor 10 onto conveyor 31 by means of the slider 33. By means of conveyors 31, 32, the products are fed to packaging station V in both cases.

FIG. 2 illustrates the store-feeding device 1 in a top view. By means of conveyor 31, 32, the series of products 13 are transported to the packaging station V. Reference number 399 illustrates the direction of transport of the conveyor 10 with length L, whereby the packaging station V, for example, can also be located on the opposite side. The direction of transport of conveyor 31, 32 would change correspondingly. The situation is analogous with direction of transport 499 and the location of conveyor 41 toward the processing station T. The present store-feeding device 1 loads the storage device 2, which works according to the "first-in—last-out" principle. The deflection pulleys 22, 23 of the respective store loops 24 are at a distance K from each other. The store loop 24 which is supplied on a revolving basis with product carrier gondolas, containers or gondolas 25 is moved past either downward for loading or upward for unloading the products at the input station E or the output station A. Each store loop 24 has carriers 241 that are permanently connected with it and are evenly distant from each other. Each gondola 25 in turn is coupled detachable at its two small sides with respectively one of these carriers 241 of store loops 24. As a result, the storage device works more efficiently with respect to known storage devices. An approximately 2 m long and approximately 5 m high storage device 2 can accept approximately 300 product series 13 consisting of chocolate bars with a weight of 100 g. For this, a belt storage device with comparable performance would have to be approximately 70 m long. The proposed device has shown to be highly space-saving, efficient and economical.

FIG. 3 illustrates a detail of the store-feeding device in the initial position. In this position, for example, maintenance or cleaning work can be performed in the section of the loading device. Moreover, FIG. 3 shows three gondolas 25 of a storage device 2 bordering store-feeding device 1. It has an input station E for loading products into the storage device, as well as an output station A for unloading the products. In input station E and the output station A are located on the same side of the storage device. The storage device 2 is filled downward in cycles or loaded and reversibly, with a cyclically moved store loop 24, emptied upward or unloaded. Loading of the storage device 2 takes place with the belt catch 120 in an anterior position, but at least at one shelf board distance a above the delivery level of conveyor 31. The thickness of the belt catch 120 is dimensioned in such a way that it, together with the height of a product 13, amounts to less than the distance a between two shelf boards. As a result, it is ensured that a product, which is pushed out of storage device 2 onto the horizontal conveyor 31, does not come in contact with the belt catch 120, when the shelf board 251 that is to be loaded is loaded by the feeding conveyor. The vertical distance of the belt catch 120 that can be positioned horizontally and/or vertically is sufficient in order to upwardly load several levels or shelf boards 251. This is particularly required when the store loop 24 is standing still, when it is momentarily blocked by slider 33. It can also be required then, when a higher packaging performance is to be achieved, whereby then the belt catch 120 synchronizes with the constantly downward-moving store loop 24. Accordingly, distance a describes a distance between the successive product deposit racks 251. Additional terms for product deposit racks are also shelf boards or levels. Distance b in turn describes the distance between a last shelf board 251 of a first gondola 25 and a first shelf board 251 of a gondola 25 that follows it. Distance c describes the distance between, for example, the respective uppermost shelf board 251 of two adjacent gondolas 25 in the vertical line or branch of the store loops 24, to which the gondolas are coupled removable at carriers 241. Moreover, the proposed store-feeding device has a rejection capability for qualitatively defective series of products 13. Defective series are, for example, too long or too high, or have too little distance from each other, which is identified in an inspection unit 141. Corresponding control signals and/or data signals are forwarded by the inspection unit 141 to the controller 14. Metal-contaminated rows of products 13 can also be defective. These are identified by a metal detector 142. Corresponding control signals and/or data signals are forwarded by the metal detector 142 to the controller 14. Defective series are rejected in a so-called retraction position of the belt catch 120. To do so, belt catch 120 is reversed and thus the loading conveyor 10 is thus shortened, so that the product series 13 fall downward onto conveyor 41 of rejection station 4, as can be seen in FIG. 1, and preferably can be transported horizontally to the production flow toward processing station T. Conveyor 41 of rejection station 4 is also described as rejection conveyor.

Figure 4:
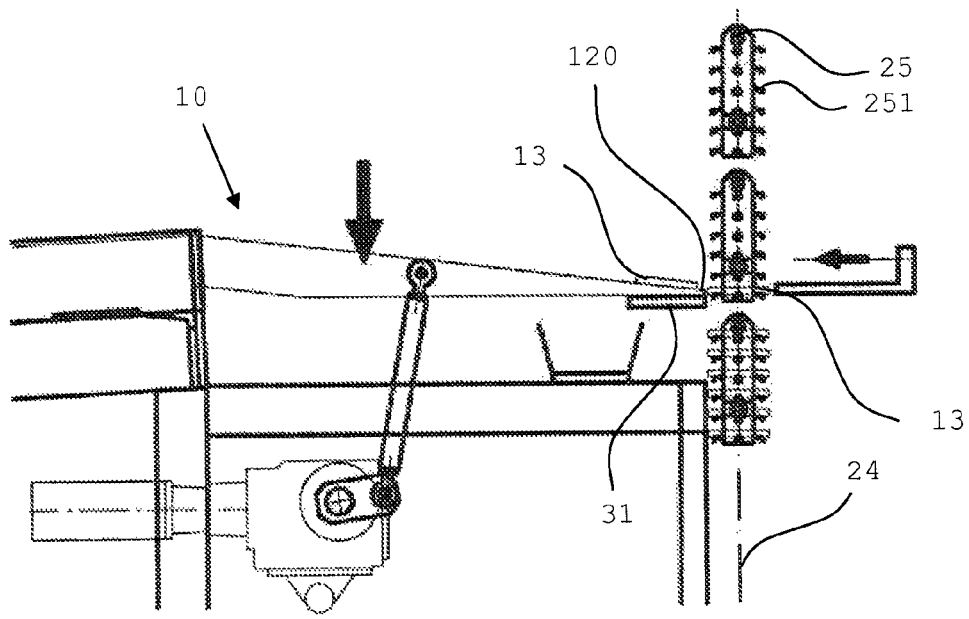
FIG. 4 shows a detail of the store-feeding device in a schematic lateral view, whereby a product is positioned in such a way that it can be deposited on a conveyor leading to the packaging station.
Figure 5:
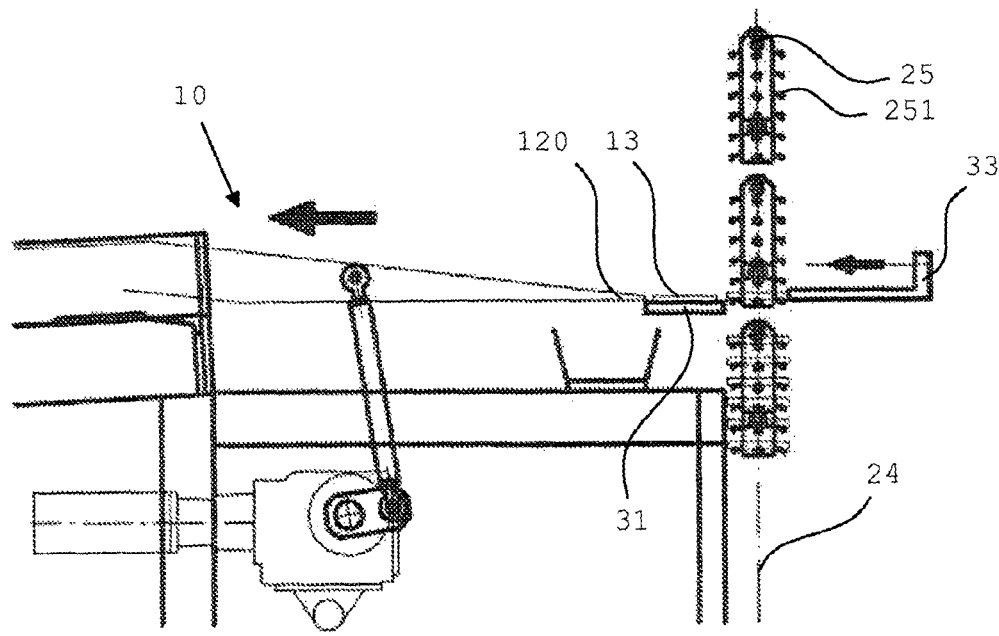
FIG. 5 shows a detail of the store-feeding device in a schematic lateral view, whereby the product has been deposited on a conveyor leading to the packaging station.

FIGS. 4 and 5 illustrate a detail of the store-feeding device 1, whereby a product 13 is positioned in such a way that it can be deposited onto a conveyor leading to the packaging station. For this, the belt catch 120 of the loading conveyor 10 is guided as closely as necessary to the shelf board 251 of gondola 25. The distance between belt catch 120 and the edge of the shelf board 251 that is to be loaded is determined, for example by the size of the product 13 or by the speed of the advancement of the loading conveyor 10. Due to the advancing of the conveyor belt, the product row 13 is being pushed onto the shelf board 251 of gondola 25. A stop 19 that can be seen in FIG. 1 prevents that the products slide beyond the shelf board or even fall off the shelf board 251.

Figure 6:
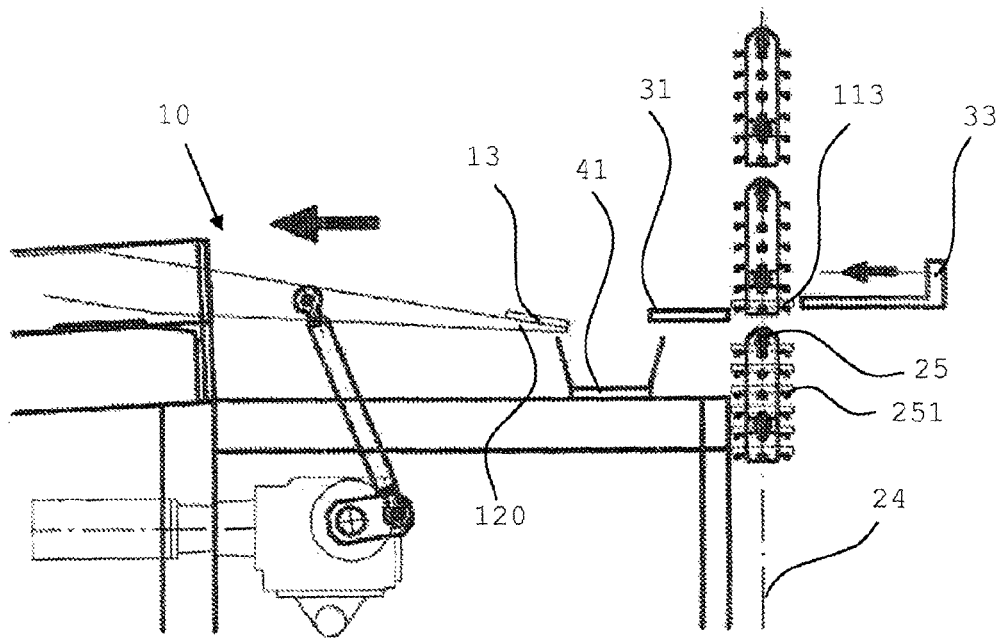
FIG. 6 shows a detail of the store-feeding device in a schematic lateral view, whereby a product is brought into such a position that it can be deposited onto a conveyor leading to a processing station.

FIG. 6 illustrates a detail of the store-feeding device 1, whereby a product 13 is brought into position in such a way that it can be deposited on a conveyor 41 that leads to the processing station T.

Figure 7:
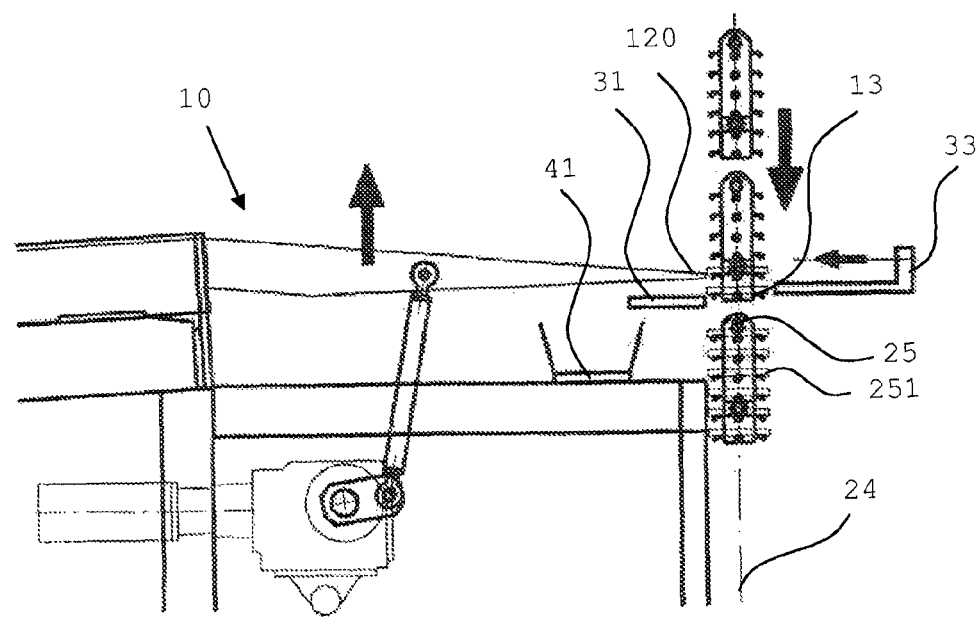
FIG. 7 shows a detail of the store-feeding device in a schematic lateral view, whereby a product has been deposited on a shelf board of a gondola in a storage device.
Figure 8:
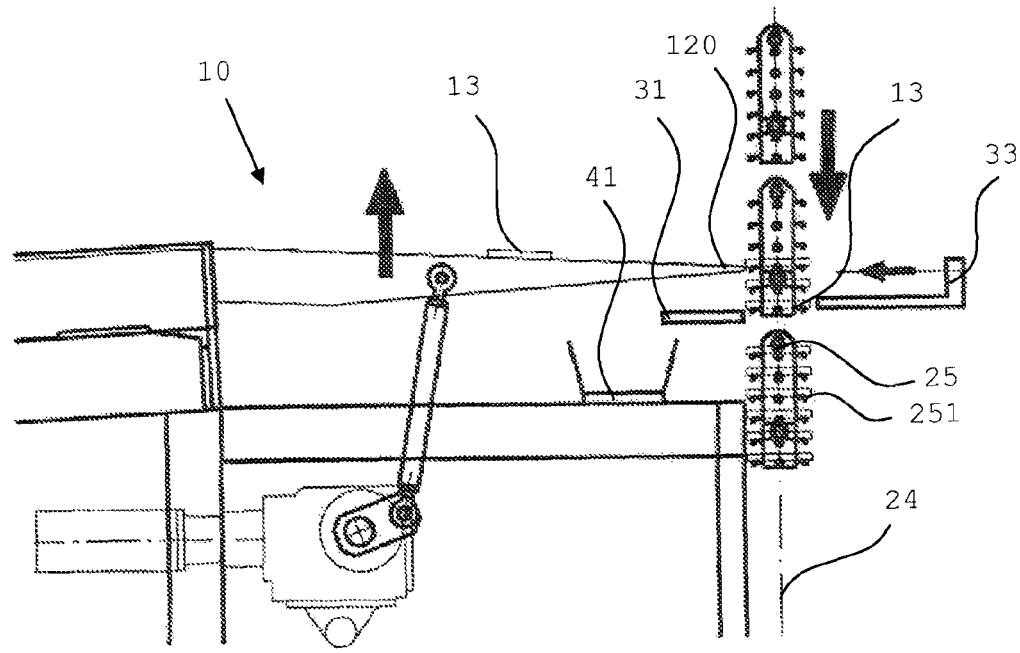
FIG. 8 shows a detail of the store-feeding device in a schematic lateral view, whereby an additional product has been deposited onto the next empty shelf board of a gondola in the storage device.

FIGS. 7 and 8 illustrate a detail of the store-feeding device 1, whereby a series of products 13 is brought into position by means of a loading conveyor 10 that is located upstream of storage device 2, in order to be deposited onto an empty shelf board 251. In FIG. 7, a first shelf board 251 is loaded in a gondola 25 that is to be loaded. FIG. 8 illustrates how a shelf board 251 that is above it is loaded with an additional subsequent product series 13. Even if the store loop 24 is stopped, or stands still, several shelf boards 251 can be loaded with products 13 by means of loading conveyor 10. The lowest loading level or the lowest position of the conveyor belt end 120 corresponds to at least the distance a between two shelf boards 251. The lowest loading level is at least at a distance a from the surface of the conveyor 31. The slider 33 is to be mounted preferably in such a way that one product series can be slid off a shelf board 251 that is in alignment with and at the height of conveyor 31, onto conveyor 31.

Figure 9:
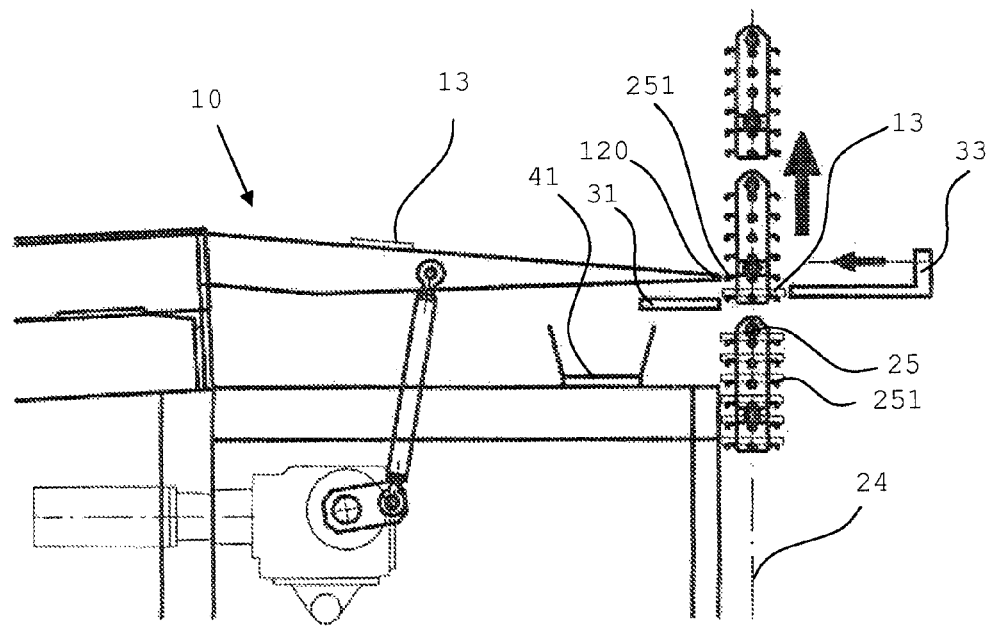
FIG. 9 shows a detail of the store-feeding device in a schematic lateral view, whereby the gondolas in the storage device are transported upward in order to push an additional product out of the storage device, onto the horizontal delivery conveyor by means of a slider.

FIG. 9 illustrates a detail of the store-feeding device, whereby the gondolas 25 in store 2 are transported upward so that an additional product 13 can be pushed out of storage device 2 onto conveyor 31 leading to the packaging station V by slider 33. Simultaneously, an additional series of products 13, which are transported in the main direction on feeding conveyor 10, can be transported to the neighboring empty shelf board 251.

Figure 10:
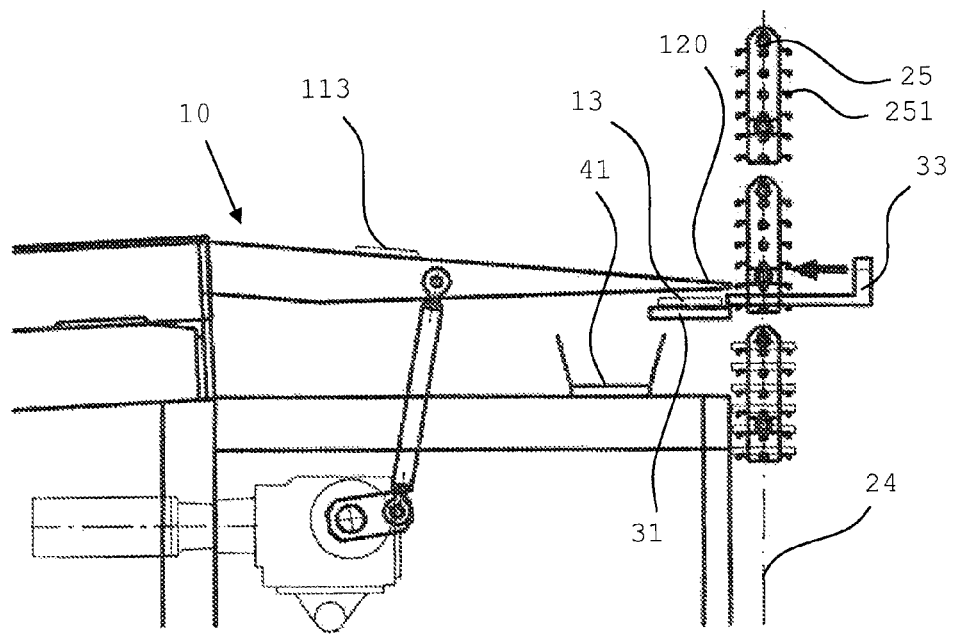
FIG. 10 shows a detail of the store-feeding device in a schematic lateral view, whereby the slider has pushed out a product onto the conveyor leading to the packaging station.

FIG. 10 illustrates a detail of the store-feeding device 1, whereby the slider 33 has pushed out a product 13 onto conveyor 31 leading to packaging station V. This preferably happens then, when coming from the production station P, the product flow cannot make a product series 13 available and a gap is created. Into this gap, a series of products 13 can then be pushed, fitting precisely, out of storage device 2 onto conveyor 31 by means of slider 33. As a result, no undersupply of products 13 occurs at packaging station V. In addition, the storage device 2 can be emptied successively. The alternating loading of conveyor 31 out of storage device 2 or from the loading conveyor 10 can be utilized in a targeted manner. Thus, for example, as can be seen in FIG. 1, with a conveyor 17 located upstream, gaps can be created in a targeted manner between subsequent series of products 13. The thereby created gaps can be filled with series of product 13 from the storage device 2. In such a phase, the packaging machine V is supplied at a higher level of performance. In addition it is achieved, that the storage device is emptied downward.

Figure 11:
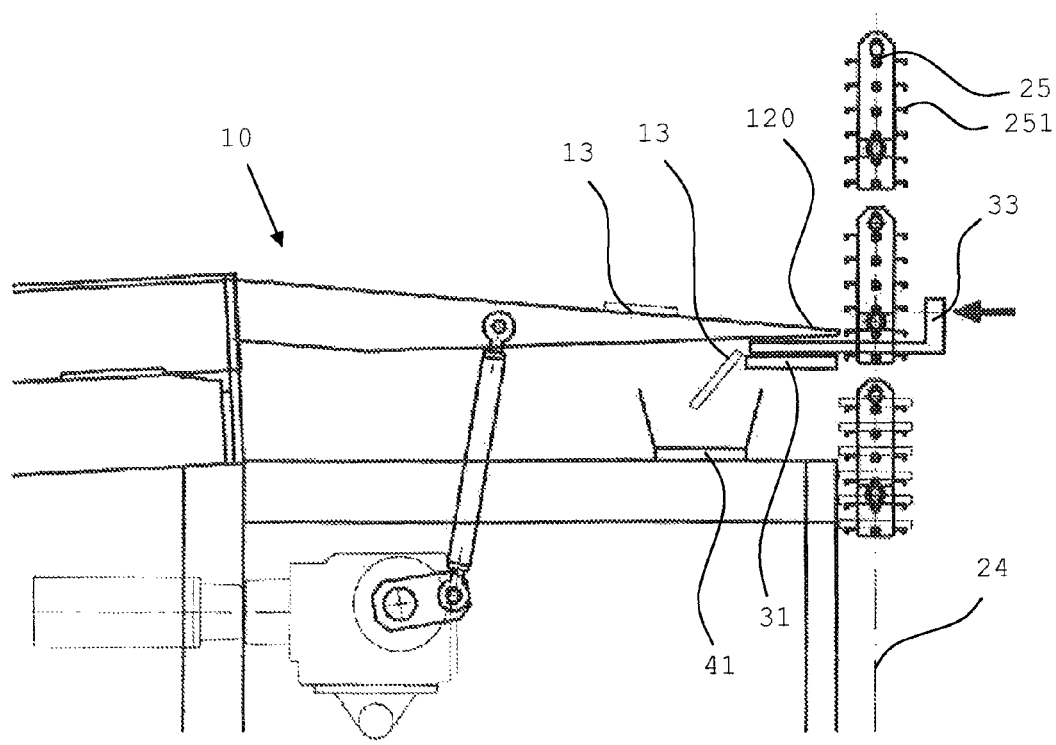
FIG. 11 shows a detail of the store-feeding device in a schematic lateral view, whereby the slider has pushed a product out of the storage device beyond the conveyor leading to the packaging station onto the conveyor leading to the processing station.

FIG. 11 shows, in connection with FIGS. 1, 2 and 3, a detail of the store-feeding device 1, whereby the slider 33 has pushed out a product 13 out of storage device 2 beyond conveyor 31 that leads to packaging station V onto conveyor 41 that leads to processing station T. By means of the controller or regulation 14 of store-feeding device 1, it can be determined, for example, how long a certain product series 13 is stored in storage device 2 during production. If a certain threshold value of storage [time] has been reached, these product series can then be separated out of the production process in a targeted manner. For this, the corresponding shelf board 251 of a gondola 25 is conveyed to the output station A of storage device 2. Slider 33 is dimensioned in such a way that it can slide out a product series 13 onto conveyor 31 and beyond it, so that the product series 13 reaches conveyor 41 of rejection station 4 leading to processing station T.

REFERENCE NUMBERS 1 store-feeding device
10 feeding conveyor, conveyor, distribution conveyor
110 conveyer belt end, belt catch, inbound end, inbound end
11111 axis of rotation
11 conveyor belt section
111 rod, push rod
112 lever
113 transmission
114 motor
12 conveyor belt section
120 conveyor belt end, belt catch, outbound end, outbound end
121 rod, push rod
122 lever
123 transmission
124 motor
13 product or product series
14 control or regulation
141 inspection unit
142 metal detector
15 belt, conveyor belt
16 frame structure
17 conveyor belt, conveyor
19 stop means, stop
197 conveyor unit, main direction of transportation
198 direction of forward and backward motion
199 direction of upward and downward rotation
2 storage device, storage unit, intermediate storage unit
21 frame structure
22 deflection pulley
220 shaft
23 deflection pulley
230 stub shaft
231 transmission
232 motor
24 store loop or store chain
241 carrier
25 gondola
251 shelf board, product deposit rack, level
299 direction of transport
3 unloading station
31 conveyor belt, conveyor
32 conveyor belt, conveyor
33 slider, slider
399 direction of transport
4 rejection station
41 conveyor belt, conveyor
499 direction of transport
A output station
E input station
F direction of transport
V packaging station
T processing station
L length
K Length
a shelf board distance
b shelf board distance
c distance, gondola height
$\alpha_1$ angle

The invention claimed is:

1. An intermediate storage device, comprising:
a storage unit including multiple deposit racks for intermediate storage of products, wherein at least two continuous storage loops of the storage device are present, by which loops the product deposit racks can be transported between an input station for receiving supplied products and an output station for delivering the intermediately stored products, wherein the product deposit racks are at a vertical distance with respect to each other in the section of the input station; and
a storage feeding device comprising a feed conveyor for transporting products in a main direction of transport between an inbound end for receiving the products, and an output end for delivering and feeding the products to the storage unit, wherein the feed conveyor comprises a vertically rotatable feed conveyor section, wherein products can be fed by the rotatable feed conveyor section to multiple products deposit racks of the storage unit;
wherein the intermediate storage device has an additional conveyor functioning as a temporary product deposit rack, to feed the products to a processing machine connected following the additional conveyor; and
wherein the feed conveyor section is configured longitudinally adjustable in the main conveying direction of transport, wherein the outbound end of the longitudinally adjustable and rotatable feed conveyor section is configured to be freely positioned horizontally and vertically between several product deposit racks and at least the additional conveyor, such that products can be fed either to the product deposit racks of the storage device or to the additional conveyor.

2. An intermediate storage device according to claim 1, wherein the additional conveyor for delivering products is disposed perpendicular to the main conveying direction of the feed conveyor so as to feed the products to a processing machine or a packaging machine, which is connected following the additional conveyor.

3. An intermediate storage device according to claim 1, wherein the intermediate storage device includes another additional conveyor that is disposed between the feed conveyor and the storage device so as to accept the products from the feed conveyor, or at the output station from the storage device, such that the products can be fed to the other additional conveyor or a processing station.

4. An intermediate storage device according to claim 1, wherein the storage device includes at least one gondola that is movably disposed on the storage loops, wherein each gondola includes multiple product deposit racks in the form of trays, the storage loops being routed continuously around return guide wheels, wherein at least one return guide wheel of each storage loop is configured to be motor-driven, the output station of the storage device including at least one pusher to dispense products onto at least one conveyor, wherein the pusher is disposed such that products can be pushed out from a tray to be emptied approximately horizontally onto each conveyor.

5. An intermediate storage device according to claim 1, wherein the input station and the output station of the storage device are disposed on a same side of the storage device.

6. An intermediate storage device according to claim 1, wherein both the input station and the output station of the storage device are disposed on a side of the storage device facing the feed conveyor.

7. An intermediate storage device according to claim 1, wherein motor-drivable return guide means are provided to swivel the feed conveyor section about a swivel axis, and further deflection means are provided to extend or shorten the longitudinally adjustable feed conveyor section.

8. An intermediate storage device according to claim 7, wherein the storage device includes a controller to control and/or regulate the deflection means based on sensor signals generatable by sensing means.

9. An intermediate storage device according to claim 1, wherein the feed conveyor of the storage feeding device is a one-piece continuous conveyor belt.

10. An intermediate storage device according to claim 1, wherein the input station of the storage device is separated from the output station of the storage device by at least the distance a between two vertically adjacent product deposit racks.

11. A method for operating an intermediate storage device according to claim 8, wherein an output end of the conveyor section is positioned horizontally and vertically in continuously variable fashion by deflection means based on control and/or data signals from the controller so as to deposit products on the additional conveyor.

12. A method for operating an intermediate storage device according to claim 8, wherein an output end of the conveyor section is positioned horizontally and vertically in continuously variable fashion by deflection means based on control and/or data signals from the controller so as to deposit products on another additional conveyor.

13. A method for operating a storage feeding device according to claim 8, wherein an output end of the conveyor section is positioned horizontally and vertically in continuously variable fashion by deflection means based on control and/or data signals from the controller so as to deposit products on at least one product deposit rack of a gondola of the storage device.

* * * * *